US006600632B1

(12) United States Patent
Prochazka et al.

(10) Patent No.: US 6,600,632 B1
(45) Date of Patent: Jul. 29, 2003

(54) CONDUCTIVE LOCK WASHER

(75) Inventors: Vaclav Prochazka, Longmont, CO (US); Dana C. Fisher, Berthoud, CO (US); Matthew J. Sandor, Boulder, CO (US); D. Michael Keffeler, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/487,232

(22) Filed: Jan. 19, 2000

(51) Int. Cl.[7] .............................................. G11B 17/02
(52) U.S. Cl. ..................... 360/264.1; 411/544
(58) Field of Search ....................... 360/99.08, 99.04, 360/98.07; 411/155, 156, 544

(56) References Cited

U.S. PATENT DOCUMENTS 404,284 A * 5/1889 Johnson ...................... 411/156
5,687,453 A * 11/1997 Megregian et al. ......... 411/544

\* cited by examiner

Primary Examiner—Robert S. Tupper
(74) Attorney, Agent, or Firm—Sheridan Ross P.C.

(57) ABSTRACT

A conductive lock washer for safely dissipating electrostatic charge which builds up on a disk surface without discharge across the head/dish gap. The lock washer, including a series of alternating inner and outer tabs, acts to reduce torque on the spindle washer damper and hoop stress on the washer itself, while still creating a conductive pathway to the top cover of the hard drive assembly.

25 Claims, 5 Drawing Sheets

CONDUCTIVE LOCK WASHER

FIELD OF THE INVENTION

The present invention relates to lock washers, and specifically to conductive lock washers for use in a disk drive or similar apparatus.

BACKGROUND OF THE INVENTION

Present day high capacity disk drives produce vibrations, such as created when the device is operated in upper and lower dynamic rocking modes. Such vibrations can cause the drive to malfunction. Thus, there is a need to damp the vibrations to ensure optimal drive performance. This can be done by securing the spindle motor shaft to a spindle washer damper (SWD), which is connected to a top cover, which in turn is connected to a baseplate. The SWD acts to attenuate vibrations produced within the drive thereby facilitating optimal drive performance.

The SWD is typically attached to the top cover of the disk drive by a non-conductive adhesive. However, the non-conductive adhesive can create an electrostatic charge problem. As electrostatic charge builds up on the spinning disk surfaces, the non-conductive adhesive creates a barrier that prevents the charge from being dissipated through the cover and baseplate. If this charge cannot be dissipated, voltage can build up across the head/disk gap until the electrostatic charge discharges across the gap, potentially causing damage to the disk surface and head, and further potentially causing data loss.

Additionally, as the SWD is attached to the top cover by an adhesive, torque generated by tightening the spindle motor shaft screw against the SWD and spindle can be transferred to the SWD and the adhesive. This can result in the SWD being twisted off of the top cover. In turn, a loose SWD can cause decreased performance or even failure of the disk drive, or if the failure occurs during the manufacture and assembly, it can result in costly reworks of the drive.

Therefore, there is a need for a conductive path from the disk surface, through the spindle motor shaft to the spindle washer damper and to the top cover. Additionally, it would be advantageous to have a torque transferring feature to help prevent the spindle motor shaft screw from applying a torque directly to the SWD and twisting it off of the adhesive and top cover during and after tightening. It would also be advantageous to have a torque locking feature, to prevent the spindle motor shaft screw from loosening during operation of the drive.

Others in the industry have developed ways to provide the ground path. For example, one method is to press the spindle motor shaft into the baseplate creating interference coupling which is able to dissipate any electrostatic charge to the baseplate. However, this method has the disadvantage of reduced precision in the manufacturing process, reducing spindle to baseplate alignment and potentially degrading drive performance. Others have also used a conductive adhesive to connect the shaft to the baseplate. However, this conductive adhesive is a potential source of out gassing and contamination failures. Additionally, this method does not transfer torque away from the SWD which can result in the previously mentioned manufacturing reworks caused by twisting the SWD off of its adhesive connection to the top cover. This method also allows the spindle motor shaft to work its way loose, as there is no torque locking between the spindle motor shaft and the SWD.

Figure 8:
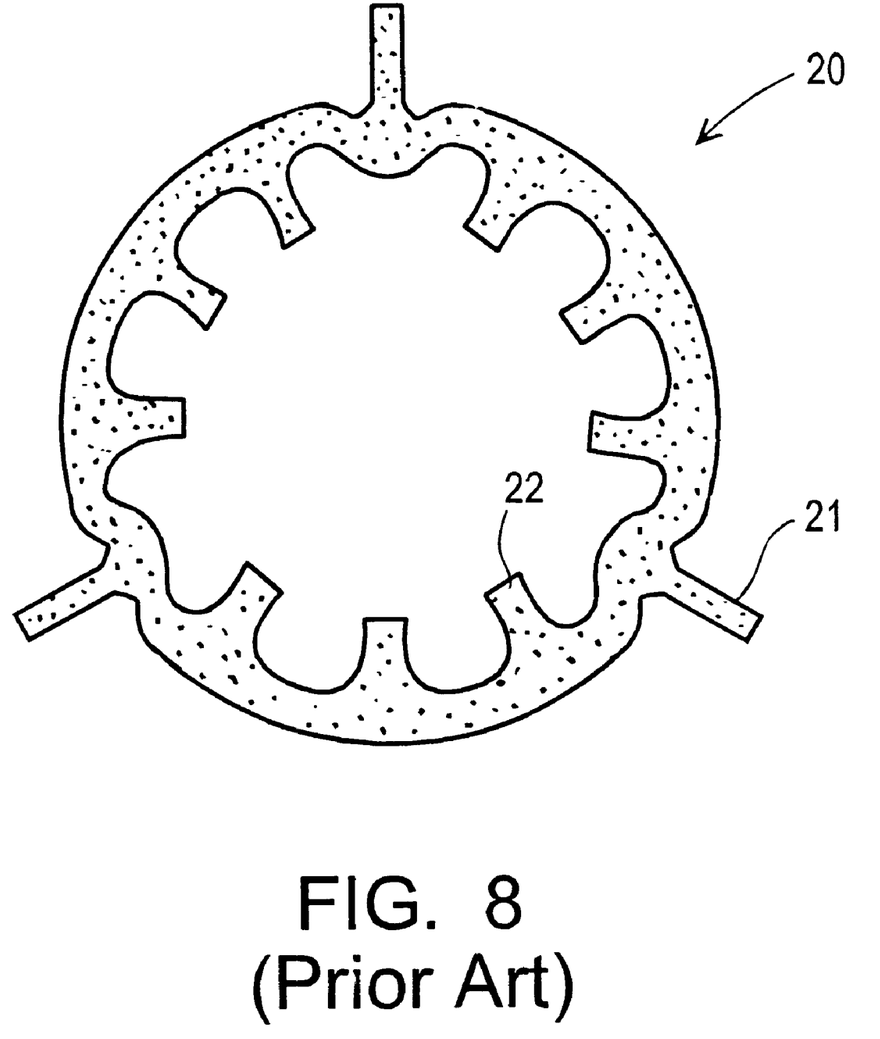
FIG. 8 is a top plan view of a prior art conductive washer.

Others have also used a conductive washer placed between the spindle motor shaft screw and the SWD such that the washer also contacts the top cover to provide a conductive path. As depicted in FIG. 8, this conductive washer 20 has three outer tabs 21 that are positioned between the top cover and SWD. The nine inner tabs 22 contact the under surface of the spindle motor shaft screw head as it is tightened into the spindle shaft. However, this method does not reduce or eliminate the application of a torque on the SWD resulting in the possible disengagement of the SWD from the adhesive connecting it to the top cover, nor does it provide a locking feature to prevent loosening of the spindle motor shaft screw.

Accordingly, there is a need for an apparatus and method that overcomes all of the problems described above.

SUMMARY OF THE INVENTION

The present invention is designed to overcome the aforementioned problems and meet the above-described needs.

The present invention provides a method and apparatus for providing a conductive path between the disk and the top cover through the spindle washer damper. More specifically, in one embodiment, the lock washer is advantageously formed such that upon insertion and tightening of the spindle motor shaft screw into the spindle, the washer deforms and makes a conductive contact with the top cover, the spindle motor shaft screw and spindle washer damper. Accordingly, electrostatic discharge of voltage built up on the spinning disks can be discharged through the conductive path without a potential discharge across the head/disk gap.

Additionally, the lock washer is advantageously formed from a series of alternating inner tabs and outer tabs interconnected by a thin piece of resilient metal. The lock washer also has a curved cross-section, such that the only portions of the lock washer in contact with the spindle washer damper, prior to the complete tightening of the spindle motor shaft screw, are the thin pieces of resilient metal which connect the inner tabs to the outer tabs. This configuration acts to reduce hoop stresses required to deform the washer, thereby reducing the torque applied to the spindle washer damper. More specifically, as the spindle motor shaft screw is being tightened the outer tabs lift and come into contact with the under surface of the top cover. Because the outer tabs contact with the top cover at a larger radial distance from the center of the lock washer than where the thin pieces of resilient metal contact the spindle washer damper and because the outer tabs place more surface area in contact with the top cover than the thin resilient strips place in contact with the spindle washer damper, more of the torque generated by the tightening of the spindle motor shaft screw is transferred to the top cover rather than to the spindle washer damper.

Furthermore, in one embodiment, the curved cross-section of the lock washer is advantageously formed to allow the lock washer to be placed between the top cover and the spindle washer damper such that it does not apply any pressure between the two members prior to the insertion of the spindle motor shaft screw, and deforms upon the insertion of the screw into the spindle shaft to contact the spindle washer damper, the top cover and the screw. In addition, upon insertion of the spindle motor shaft screw into the spindle shaft, the lock washer continues to apply lifting pressure to the under side of the screw head, thereby resisting loosening of the screw during operation of the disk drive.

DETAILED DESCRIPTION OF THE PREFERRED EMBODIMENT

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 1:
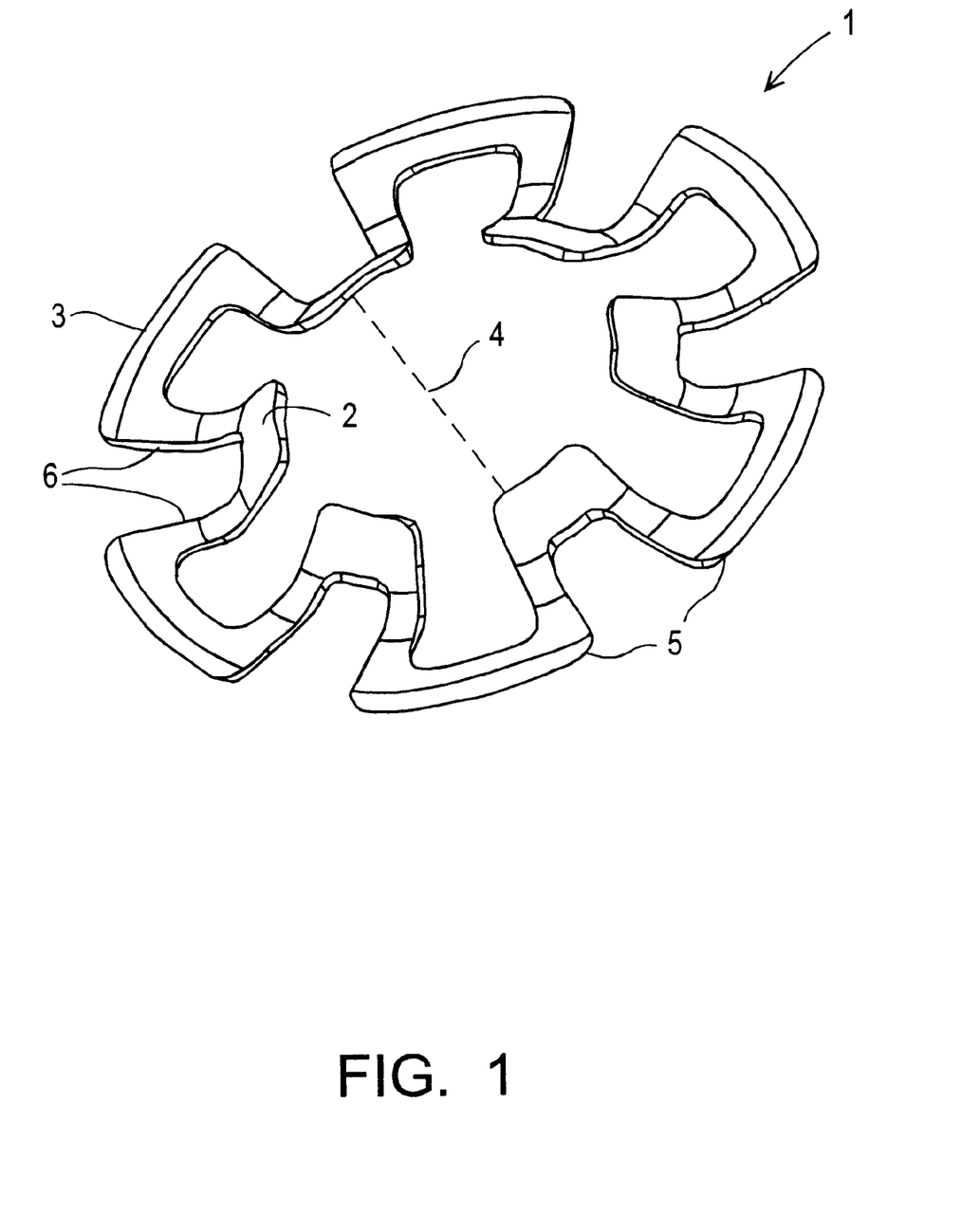
FIG. 1 is a free body diagram of the lock washer of the present invention.

With reference to FIG. 1, the lock washer 1 is shown in detail. The lock washer 1 in a preferred embodiment is made of stainless steel and has a thickness of 0.003 inches. The lock washer 1 consists of a series of inner tabs 2 and outer tabs 3. The inner tabs 2 generally form a central aperture 4, and the outer tabs 3 generally form an outer circumference 5. The inner tabs 2 and outer tabs 3 are connected by a curved piece 6 which, being preferably made of stainless steel, is easily deformable. One of skill in the art will appreciate that the precise metal selected can vary, provided it is conductive and flexible.

With reference now to FIGS. 2–5, a disk drive assembly detail is shown. A spindle washer damper (SWD) 7 is attached to the top cover 8 of the drive by an adhesive 9. The lock washer 1 initially rests on the SWD 7. During assembly, a spindle motor shaft screw 10 is inserted through the top cover 8, the central aperture 4 of the lock washer 1, and the SWD 7 and into the spindle motor shaft 11.

Figure 2:
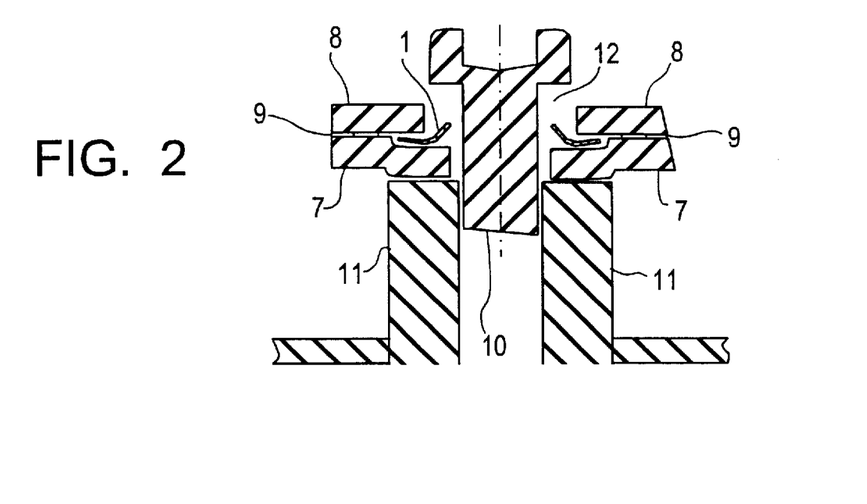
FIGS. 2 through 4 are cross-sectional views of a disk drive top cover assembly showing the lock washer of the present invention at various stages of deformation as the spindle shaft screw is tightened into the spindle shaft.
Figure 3:
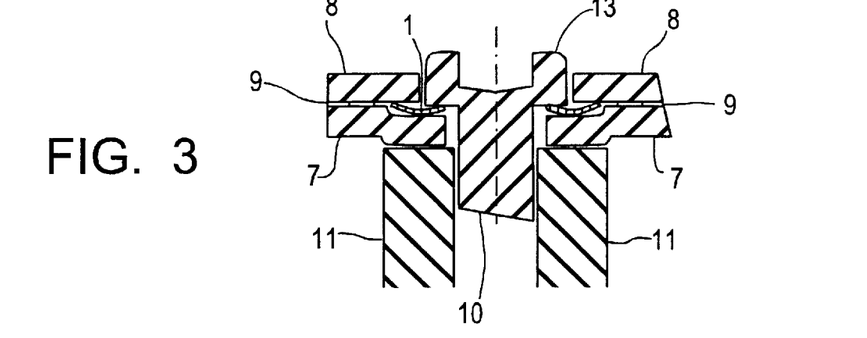
Figure 4:
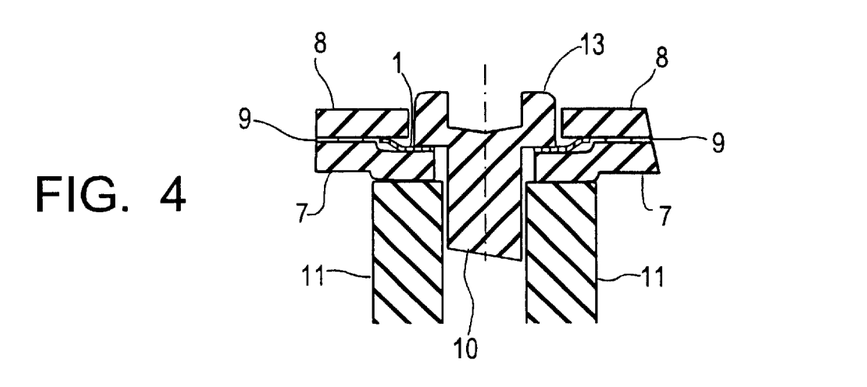
Figure 5:
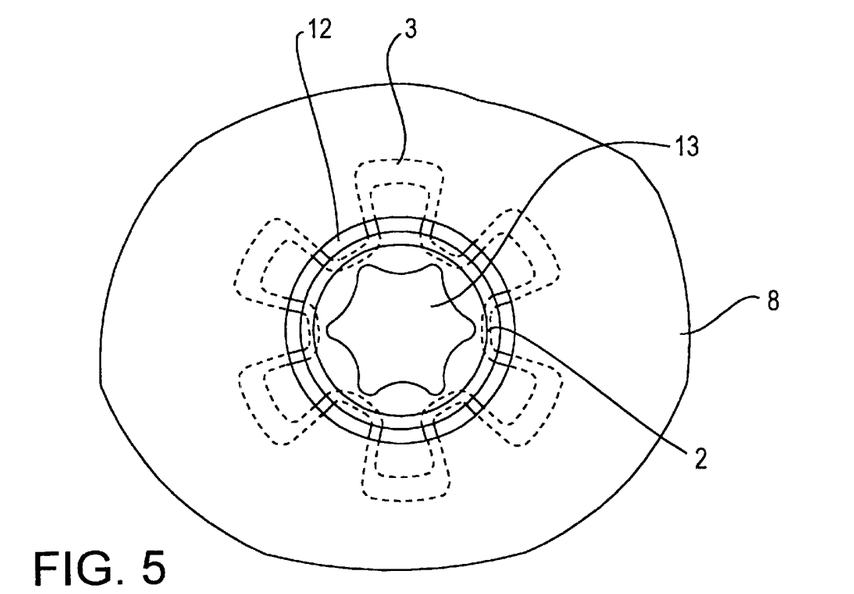
FIG. 5 is a top view of a section of the top cover of an embodiment of the present invention.

As shown in FIG. 5, the outer circumference 5 formed by the outer tabs 3 advantageously has a larger diameter than the hole 12 in the top cover 8. Referring now to FIGS. 2–4, the lock washer 1 is placed in between the SWD 7 and the top-cover 8 when the two pieces are assembled. The lock washer 1 is therefore aligned with the hole in the SWD 7 as well as being aligned with the hole in the top cover 8, thereby eliminating the need to manually align the lock washer 1 during the insertion of the spindle motor shaft screw 10. The diameter of the central aperture 4 is larger than the diameter of the spindle motor shaft screw 10, but smaller than the outer diameter of the head 13 of the spindle motor shaft screw 10.

As shown in FIG. 3, as the spindle motor shaft screw 10 is inserted into the spindle motor shaft 11, the head 13 of the spindle motor shaft screw 10 comes into contact with the inner tabs 2 of the lock washer 1 and begins to deform the lock washer 1. The spindle motor shaft screw 10 forces the inner tabs 2 of the lock washer 1 down, which in turn forces the outer tabs 3 of the lock washer 1 up and into contact with the bottom surface of the top cover.

Referring now to FIG. 4, when the spindle motor shaft screw 10 is fully inserted into the spindle motor shaft 11, the inner tabs 2 of the lock washer 1 are forced into contact with the SWD 7, and the spindle motor shaft screw 11. Additionally, the outer tabs 3 are forced into contact with the bottom surface of the top cover 8. The lock washer 1 thus forms a conductive path between the SWD 7, the spindle motor shaft 11, the spindle motor shaft screw 10, and the top cover 8.

Referencing FIG. 2, the pre-assembly alignment features of an embodiment of the lock washer 1 will now be described. Prior to the insertion of the spindle motor shaft screw 10, the lock washer 1 is aligned such that it fits within the space formed between the SWD 7 and the top cover 8. The lock washer 1 rests upon the SWD 7 with only the curved pieces 6 having contact with the SWD 7. In this way, there is no pressure exerted on the SWD adhesive 9 prior to the insertion of the spindle motor shaft screw 10.

Referencing now FIGS. 1–5, the torque minimizing features of the lock washer 1 will now be described in detail. Due to the alignment of the inner tabs 2 and outer tabs 3, the inner and outer circumference of the lock washer 1 do not form one continuous hoop. This way, when the lock washer 1 is deformed, the deformation occurs in the curved pieces 6 that connect the inner tabs 2 and outer tabs 3. The force required to deform these curved pieces 6 is significantly less than the force that would be required to deform a continuous hoop. Additionally, due to the curved shape of the lock washer 1, the outer tabs 3 contact the top cover 8, and the inner tabs 2 contact the under surface of the spindle motor shaft screw head 13 and the SWD 7. The larger diameter of the outer tabs 3 causes the majority of the torque generated upon insertion of the spindle motor shaft screw 10 to be transferred to the top cover 8 and away from the SWD 7 and SWD adhesive 9. This torque transfer is due to both the larger torque associated with the larger radius of the outer tabs 3, as well as decreased surface area in contact with the SWD 7 as compared to the top cover 8. This combination of the reduced force required to deform the lock washer 1, along with the transfer of the majority of the torque to the top cover 8 results in significantly less torque being applied to the SWD 7, and the SWD adhesive 9.

Figure 6:
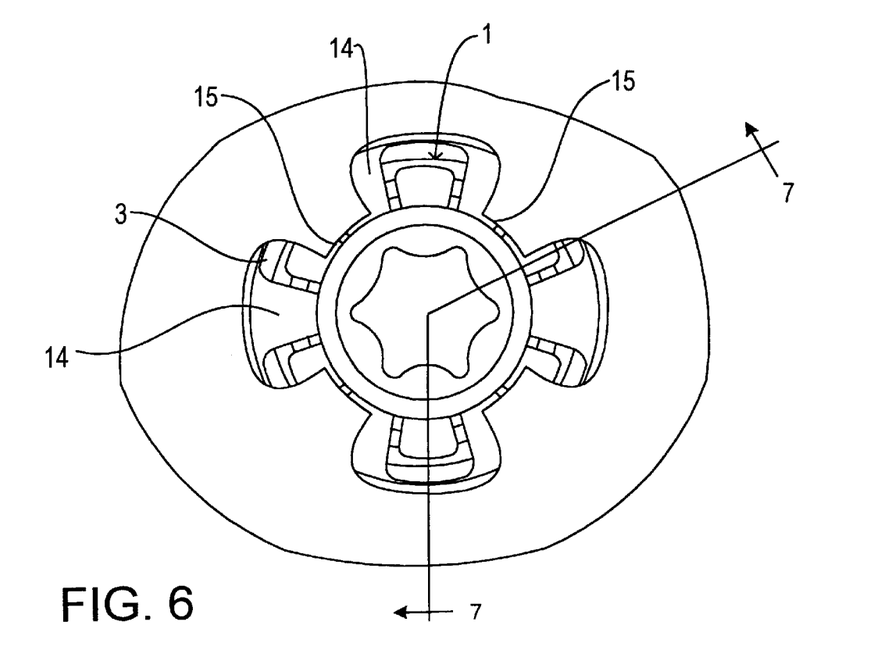
FIG. 6 is a top view of a section of the top cover of an embodiment of the present invention.
Figure 7:
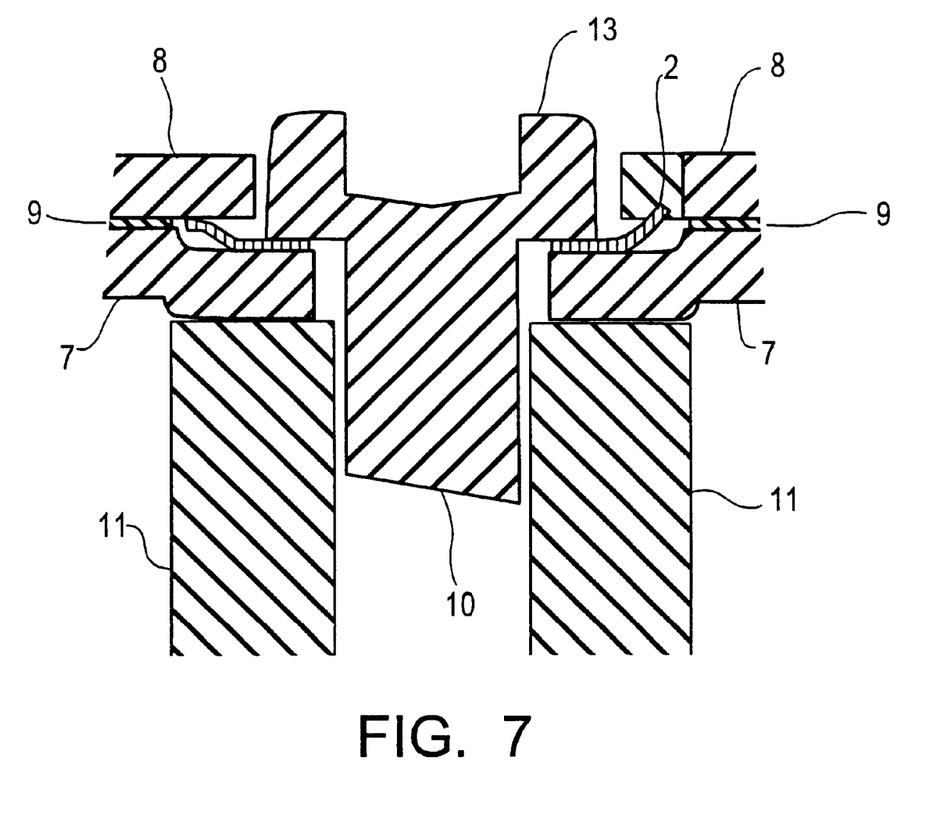
FIG. 7 is a cross-sectional view of the disk drive top cover assembly taken along line 7—7 of FIG. 6, showing an outer tab of the lock washer engaging a cut out in the top cover and another outer tab engaging the under surface of the top cover.

In another embodiment of the present invention, shown in FIGS. 6–7, the top cover 8 advantageously has slots 14 and top cover tabs 15 formed in the area where the lock washer 1 contacts it. In this embodiment, as shown in FIG. 7, as the lock washer 1 is deformed upon the insertion of the spindle motor shaft screw 10, one or more of the outer tabs 3 will extend up into a slot 14 in the top cover 8. Once the outer tab 3 has extended into the slot 14 in the top cover 8, continued torque on the lock washer 1 will cause the outer tab 3 to come into contact with the edge of a top cover tab 15. As the spindle motor shaft screw 10 continues to be inserted into the spindle motor shaft 11, the torque generated by the tightening of the spindle motor shaft screw 10 will be transferred to the top cover 8 through the outer tab 3 that has come into contact with the top cover tab 15. This will in turn reduce the torque that is applied to the SWD 7, and the SWD adhesive 9. A label or other closure may be applied over the opening in the top cover 8 to prevent particulate or other contamination from entering the drive housing.

Once the disk drive is assembled, the lock washer 1 will continue to exert force upon the top cover 8, the spindle motor shaft screw 10, and the SWD 7. This continuing pressure will act to help prevent the spindle motor shaft screw 10 from loosening during the operation of the disk drive. Additionally, in the embodiment which utilizes the top cover tabs 15 and top cover slots 14, any loosening of the spindle motor shaft screw 10 will result in the lock washer 1 turning and thereby cause one of the outer tabs 3 to contact the side of a top cover tab 15 which will act to prevent any further loosening of the spindle motor shaft screw 10.

It will be understood that the invention may be embodied in other specific forms without departing from the spirit or central characteristics thereof The present examples and embodiments, therefore, are to be considered in all respects as illustrative and not restrictive, and the invention is not intended to be limited to the details given herein.

What is claimed is:

1. A lock washer for creating a conductive path, comprising:
   a washer body having a plurality of inner tabs and outer tabs;
   said washer body forming an integral hoop with said inner tabs defining a central aperture and said outer tabs forming an outer circumference, said central aperture adapted to receive the threaded shaft of a screw but smaller than the head of said screw;
   said inner tabs located at a first elevation and said outer tabs located at a second elevation, wherein said first elevation is different than said second elevation; and
   wherein as the screw is tightened said inner tabs are forced downward and said outer tabs move upward, and wherein a greater percentage of the torque generated by tightening the screw is transferred to an object in contact with the outer tabs rather than an object in contact with the inner tabs.

2. A lock washer for creating a conductive path, comprising:
   a washer body having a plurality of inner tabs and outer tabs;
   said washer body forming from an integral hoop with said inner tabs defining a central aperture and said outer tabs forming an outer circumference, said central aperture adapted to receive the threaded shaft of a screw but smaller than the head of said screw;
   said inner tabs located at a first elevation and said outer tabs located at a second elevation, wherein said first elevation is different than said second elevation; and
   wherein as the screw is tightened said inner tabs are forced downward and said outer tabs move upward, and wherein the shape of said inner tabs and said outer tabs minimizes the hoop stresses placed on said washer body as it is deformed.

3. A lock washer for use in a disk drive, the disk drive having a spindle motor shaft, a spindle washer damper, a spindle motor shaft screw and a top cover, said washer comprising:
   a washer body having a plurality of inner tabs and outer tabs, said inner tabs connected to said outer tabs by a resilient member, wherein said inner tabs are between adjacent pairs of outer tabs;
   said inner tabs located at a first elevation and said outer tabs located at a second elevation, said first elevation different than said second elevation;
   said washer body being made of a conductive material;
   said washer body having a curved cross-sectional shape;
   said inner tabs engaging the bottom surface of the head of the spindle motor shaft screw connected to the spindle motor shaft of the disk drive, and at least one of said outer tabs engaging the bottom surface of the top cover of the disk drive;
   said washer body thereby forming a conductive path from the spindle motor shaft to the top cover, wherein said inner tabs and at least one outer tab apply pressure between the top cover and the spindle motor shaft preventing the screw from unscrewing during use, at least one outer tab contacts the top cover, at least one resilient member contacts the spindle washer damper, and the torque applied by said at least one outer tab is greater than the torque applied by said resilient member.

4. A disk drive assembly, comprising:
   a spindle screw, comprising:
      a threaded portion; and
      a head portion;
   a top cover, comprising a top cover aperture for receiving a head of said spindle screw;
   a spindle shaft, wherein said spindle shaft is adapted to receive a threaded portion of said spindle screw;
   a spindle damper, comprising:
      a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
      a spindle damper recess, wherein said recess is located about said spindle damper central aperture;
   a conductive lock washer, comprising:
      a plurality of inner tabs, wherein said inner tabs form a central aperture having a diameter greater than a diameter of said threaded portion of said spindle screw and less than a diameter of said head of said spindle screw, and wherein when said conductive lock washer is in an uncompressed state at least a portion of each of said inner tabs occupies a first plane;
      a plurality of outer tabs, wherein said outer tabs form an outer circumference having a diameter that is greater than a diameter of said top cover aperture and less than a diameter of said recess of said spindle damper, and wherein in said uncompressed state at least a portion of each of said outer tabs occupies a second plane; and
      a plurality of curved pieces interconnecting said inner tabs to adjacent outer tabs, wherein at least a portion of each of said curved pieces interconnecting said inner tabs to said outer tabs is in contact with said spindle washer damper when said conductive lock washer is in a partially compressed state, wherein a surface area of a portion of said outer tabs in contact with said top cover is greater than a surface area of said portion of said curved pieces contacting said spindle washer damper, and when said conductive lock washer is in a compressed state at least a portion of said inner tabs are in contact with said head of said spindle screw and at least a portion of said outer tabs are in contact with said top cover to form an electrically conductive path between said spindle shaft and said top cover.

5. A disk drive assembly, comprising:
   a spindle screw, comprising:
      a threaded portion; and
      a head portion;
   a top cover, comprising a top cover aperture for receiving a head of said spindle screw, said top cover aperture having a first slot;
   a spindle shaft, wherein said spindle shaft is adapted to receive a threaded portion of said spindle screw;

a spindle damper, comprising:
  a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
  a spindle damper recess, wherein said recess is located about said spindle damper central aperture;
a conductive lock washer, comprising:
  a plurality of inner tabs, wherein said inner tabs form a central aperture having a diameter greater than a diameter of said threaded portion of said spindle screw and less than a diameter of said head of said spindle screw, and wherein when said conductive lock washer is in an uncompressed state at least a portion of each of said inner tabs occupies a first plane;
  a plurality of outer tabs, wherein said outer tabs form an outer circumference having a diameter that is greater than a diameter of said top cover aperture and less than a diameter of said recess of said spindle damper, and wherein in said uncompressed state at least a portion of each of said outer tabs occupies a second plane; and
  a plurality of curved pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs are in contact with said top cover to form an electrically conductive path between said spindle shaft and said top cover, and said first slot of said top cover aperture is positioned adjacent said outer circumference of said conductive lock washer and has a width greater than a width of a one of said outer tabs of said conductive lock washer such that an edge of said first slot is in contact with an edge of an outer tab of said conductive lock washer.

6. The disk drive assembly of claim 5, wherein said top cover comprises a plurality of slots, wherein said slots are formed adjacent said top cover aperture, wherein at least a one of said outer tabs of said conductive lock washer extends into at least one of said slots when said inner tabs are drawn towards said spindle washer damper by insertion of said spindle screw in said spindle.

7. The disk drive assembly of claim 6, wherein each of said slots is formed between a pair of tabs.

8. A disk drive assembly, comprising:
  a spindle screw, comprising:
    a threaded portion; and
    a head portion;
  a top cover, comprising a top cover aperture for receiving a head of said spindle screw;
  a spindle shaft, wherein said spindle shaft is adapted to receive a threaded portion of said spindle screw;
  a spindle damper, comprising:
    a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
    a spindle damper recess, wherein said recess is located about said spindle damper central aperture;
  a conductive lock washer, comprising:
    a plurality of inner tabs, wherein said inner tabs form a central aperture having a diameter greater than a diameter of said threaded portion of said spindle screw and less than a diameter of said head of said spindle screw, and wherein when said conductive lock washer is in an uncompressed state at least a portion of each of said inner tabs occupies a first plane;
    a plurality of outer tabs, wherein said outer tabs form an outer circumference having a diameter that is greater than a diameter of said top cover aperture and less than a diameter of said recess of said spindle damper, and wherein in said uncompressed state at least a portion of each of said outer tabs occupies a second plane; and
    a plurality of curved pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs are in contact with said top cover to form an electrically conductive path between said spindle shaft and said top cover, wherein said top cover further comprises a first edge positioned adjacent said outer circumference of said conductive lock washer, wherein said first edge is in contact with an edge of an outer tab of said conductive lock washer, and rotational movement of said conductive lock washer relative to said top cover is prevented by interference between said edge and said at least one of said outer tabs of said conductive lock washer.

9. A method for electrically interconnecting components of a disk drive, comprising:
  interconnecting a top cover to a spindle damper;
  providing a conductive lock washer;
  contacting said spindle damper with at least one of a plurality of curved pieces of said conductive lock washer;
  placing said conductive washer between said spindle damper and said top cover;
  inserting a spindle motor shaft screw through an aperture in said top cover;
  inserting said spindle motor shaft screw into a central aperture of said conductive lock washer;
  inserting said spindle motor shaft screw into a central aperture of said spindle damper;
  interconnecting said spindle motor shaft screw to a spindle motor shaft;
  contacting a head of said spindle motor shaft screw with an inner tab of said conductive lock washer;
  tightening said spindle motor shaft screw in said spindle motor shaft;
  contacting said spindle damper with said inner tab of said conductive lock washer;
  reducing a curve of said at least one of said curved pieces of said conductive lock washer;
  contacting said top cover with an outer tab of said conductive lock washer, whereby an electrically conductive path between said top cover and said spindle motor shaft is established; and
  positioning said conductive lock washer such that said outer tab of said conductive lock washer is in contact with an edge formed in said top cover.

10. The method of claim 9, wherein said edge is part of a slot formed in said top cover, said method further comprising:

positioning said conductive lock washer such that an outer tab of said conductive lock washer is received by said slot formed in said top cover to counteract a torque generated in said conductive lock washer.

11. The method of claim 10, wherein disengagement of said cover from saddle washer damper is inhibited.

12. A method for electrically interconnecting components of a disk drive, comprising:

interconnecting a top cover to a spindle damper;

providing a conductive lock washer;

contacting said spindle damper with at least one of a plurality of curved pieces of said conductive lock washer;

placing said conductive washer between said spindle damper and said top cover;

inserting a spindle motor shaft screw through an aperture in said top cover;

inserting said spindle motor shaft screw into a central aperture of said conductive lock washer;

inserting said spindle motor shaft screw into a central aperture of said spindle damper;

interconnecting said spindle motor shaft screw to a spindle motor shaft;

contacting a head of said spindle motor shaft screw with an inner tab of said conductive lock washer;

tightening said spindle motor shaft screw in said spindle motor shaft;

contacting said spindle damper with said inner tab of said conductive lock washer;

reducing a curve of said at least one of said curved pieces of said conductive lock washer; and contacting said top cover with an outer tab of said conductive lock washer, whereby an electrically conductive path between said top cover and said spindle motor shaft is established, wherein at least prior to said step of contacting said inner tab of said conductive lock washer is not in contact with said spindle damper.

13. The method of claim 12, wherein a first portion of a torque generated in said conductive washer is dissipated by friction between said curved portion of said conductive lock washer and said spindle damper, wherein a second portion of said torque generated in said conductive lock washer is dissipated by friction between said outer tabs and said top cover, wherein said second portion is greater than said first portion.

14. A disk drive assembly, comprising:

a spindle screw, comprising:
      a threaded portion; and
      a head portion;

a top cover, comprising a top cover aperture for receiving a head of said spindle screw;

a spindle shaft, wherein said spindle shaft is adapted to receive a threaded portion of said spindle screw;

a spindle damper, comprising:
      a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
      a spindle damper recess, wherein said recess is located about said spindle damper central aperture;

a conductive lock washer, comprising:
      a plurality of inner tabs, wherein said inner tabs form a central aperture having a diameter greater than a diameter of said threaded portion of said spindle screw and less than a diameter of said head of said spindle screw;
      a plurality of outer tabs, wherein said outer tabs form an outer circumference having a diameter that is greater than a diameter of said top cover aperture and less than a diameter of said recess of said spindle damper; and
      a plurality of curved interconnecting pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs are in contact with said top cover to form an electrically conductive path between said spindle shaft and said top cover, at least a portion of each of said curved interconnecting pieces interconnecting said inner tabs to said outer tabs is in contact with said spindle washer damper when said conductive lock washer is in a partially compressed state, and a surface area of said portion of said outer tabs in contact with said top cover is greater than a surface area of said portion of said curved pieces contacting said spindle washer damper.

15. A disk drive assembly, comprising:

a spindle screw, comprising:
      a threaded portion; and
      a head portion;

a top cover, comprising a top cover aperture for receiving a head of said spindle screw;

a spindle shaft, wherein said spindle shaft is adapted to receive a threaded portion of said spindle screw;

a spindle damper, comprising:
      a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
      a spindle damper recess, wherein said recess is located about said spindle damper central aperture;

a conductive lock washer, comprising:
      a plurality of inner tabs, wherein said inner tabs form a central aperture having a diameter greater than a diameter of said threaded portion of said spindle screw and less than a diameter of said head of said spindle screw;
      a plurality of outer tabs, wherein said outer tabs form an outer circumference having a diameter that is greater than a diameter of said top cover aperture and less than a diameter of said recess of said spindle damper; and
      a plurality of curved interconnecting pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs arc in contact with said top cover to form an electrically conductive path between said spindle shaft and said top cover, wherein said top cover further comprises a first edge positioned adjacent said outer circumference of said conductive lock washer, and said first edge is in contact with an edge of an outer tab of said conductive lock washer.

16. The disk drive assembly of claim 15, wherein rotational movement of said conductive lock washer relative to said top cover is prevented by interference between said first edge and said edge of said outer tab of said conductive lock washer.

17. A disk drive assembly, comprising:
a spindle screw, comprising:
a threaded portion; and
a head portion;
a top cover, comprising a top cover aperture for receiving a head of said spindle screw;
a spindle shaft, wherein said spindle shaft is adapted to receive a threaded portion of said spindle screw;
a spindle damper, comprising:
a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
a spindle damper recess, wherein said recess is located about said spindle damper central aperture;
a conductive lock washer, comprising:
a plurality of inner tabs, wherein said inner tabs form a central aperture having a diameter greater than a diameter of said threaded portion of said spindle screw and less than a diameter of said head of said spindle screw;
a plurality of outer tabs, wherein said outer tabs form an outer circumference having a diameter that is greater than a diameter of said top cover aperture and less than a diameter of said recess of said spindle damper; and
a plurality of curved interconnecting pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs are in contact with said top cover to form an electrically conductive path between said spindle shaft and said top cover, wherein said top cover comprises a first slot positioned adjacent said outer circumference of said conductive lock washer, a width of said slot is greater than a width of a one of said outer tabs of said conductive lock washer, and an edge of said slot is in contact with an edge of an outer tab of said conductive lock washer.

18. The disk drive assembly of claim 17, wherein said top cover comprises a plurality of said slots, wherein said slots are formed adjacent said top cover aperture, wherein at least a one of said outer tabs of said conductive lock washer extends into at least one of said slots when said inner tabs are drawn towards said spindle washer damper by insertion of said spindle screw in said spindle.

19. The disk drive assembly of claim 18, wherein each of said slots is formed between a pair of tabs.

20. A disk drive assembly, comprising:
a spindle screw, comprising:
a threaded portion; and
a head portion;
a top cover, comprising a top cover aperture for receiving a head of said spindle screw;
a spindle shaft, wherein said spindle shaft is adapted to receive a threaded portion of said spindle screw;
a spindle damper, comprising:
a spindle damper central aperture, wherein said spindle damper central aperture has a diameter that is greater than a diameter of said threaded portion of said spindle screw and less than a diameter of said head portion of said spindle screw, and wherein said spindle damper is interposed between an end of said spindle shaft and said top cover;
a spindle damper recess, wherein said recess is located about said spindle damper central aperture;
a conductive lock washer, comprising:
a plurality of inner tabs, wherein said inner tabs form a central aperture having a diameter greater than a diameter of said threaded portion of said spindle screw and less than a diameter of said head of said spindle screw;
a plurality of outer tabs, wherein said outer tabs form an outer circumference having a diameter that is greater than a diameter of said top cover aperture and less than a diameter of said recess of said spindle damper; and
a plurality of curved interconnecting pieces interconnecting said inner tabs to adjacent outer tabs, wherein when said conductive lock washer is in a compressed state within said disk drive assembly at least a portion of said inner tabs are in contact with said head of said spindle screw and at least a portion of said outer tabs are in contact with said top cover to form an electrically conductive path between said spindle shaft and said top cover, wherein said top cover comprises an opening, and at least one of said outer tabs is seated within said opening when said conductive lock washer is in a compressed state.

21. A method for reducing a torque transferred from a conductive lock washer to a first component, comprising:
tightening a screw having a head bearing on first portions of said conductive lock washer at a first diameter;
contacting a first component with second portions of said conductive lock washer at a second diameter, wherein said second diameter is greater than said first diameter; and
contacting a second component with third portions of said conductive lock washer at a third diameter, wherein said third diameter is greater than said second diameter, and wherein a greater proportion of a torque generated during said step of tightening is transferred to said second component than to said first component.

22. The method of claim 21, wherein said conductive lock washer biases said head of said screw away from said first component during said step of tightening.

23. The method of claim 22, wherein said conductive lock washer does not bias said first component from said second component prior to said step of tightening.

24. A disk drive assembly, comprising:
a spindle motor shaft;
means for dampening vibrations in said disk drive;
means for securing said spindle motor shaft to said means for dampening;

means connected to said means for dampening for enclosing at least a portion of said disk drive assembly; and means for electrically interconnecting said spindle motor shaft to said means for enclosing, wherein said means for electrically interconnecting does not bias said means for dampening away from said means for enclosing when said means for securing is in a first position, and wherein said means for interconnecting biases said means for securing away from said spindle motor shaft when said means for securing is in a second position.

25. An electrically conductive lock washer, comprising:

means for contacting a first component;

means for contacting a second component;

means for interconnecting said means for contacting a first component and said means for contacting a second component, wherein in an uncompressed state, at least a portion of said means for contacting a first component intersects a first plane and said means for contacting a second component does not intersect said first plane.

* * * * *

UNITED STATES PATENT AND TRADEMARK OFFICE
CERTIFICATE OF CORRECTION

PATENT NO.    : 6,600,632 B1
DATED         : July 29, 2003
INVENTOR(S)   : Prochazka et al.

It is certified that error appears in the above-identified patent and that said Letters Patent is hereby corrected as shown below:

Column 5,
Line 34, please delete the word "from";

Column 8,
Line 33, please add the word -- first -- after the words "between said" and before the word "edge";

Column 9,
Line 9, please add the word -- top -- after the word "said" and before the word "cover"; and Column 10,
Line 67, please delete the word "arc" and substitute therefor the word -- are --.

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,600,632 B1
DATED : July 29, 2003
INVENTOR(S) : Joshua D. Karnes

It is certified that error appears in the above-identified patent and that said Letters Patent is hereby corrected as shown below:

Column 8,
Line 22, after "circuit board of claim", delete "17" and insert -- 11 --.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.        : 6,600,632 B1
APPLICATION NO.   : 09/487232
DATED             : July 29, 2003
INVENTOR(S)       : Vaclav Prochazka et al.

It is certified that error appears in the above-identified patent and that said Letters Patent is hereby corrected as shown below:

This certificate supersedes certificate of correction issued February 17, 2004, the number was erroneously mentioned and should be vacated since no certificate of correction was granted for this patent number.

Signed and Sealed this

Twelfth Day of September, 2006

JON W. DUDAS
*Director of the United States Patent and Trademark Office*